US009250146B2

(12) United States Patent
Krans et al.

(10) Patent No.: US 9,250,146 B2
(45) Date of Patent: Feb. 2, 2016

(54) MULTIDIMENSIONAL STRAIN GAGE

(71) Applicant: Western New England University, Springfield, MA (US)

(72) Inventors: Jacob Krans, Monterey, MA (US); Anthony Scibelli, Vernon, CT (US)

(73) Assignee: WESTERN NEW ENGLAND UNIVERSITY, Springfield, MA (US)

( * ) Notice: Subject to any disclaimer, the term of this patent is extended or adjusted under 35 U.S.C. 154(b) by 58 days.

(21) Appl. No.: 14/177,375

(22) Filed: Feb. 11, 2014

(65) Prior Publication Data

US 2014/0224036 A1 Aug. 14, 2014

Related U.S. Application Data

(60) Provisional application No. 61/763,678, filed on Feb. 12, 2013.

(51) Int. Cl.
*G01L 1/20* (2006.01)
(52) U.S. Cl.
CPC ...................... *G01L 1/205* (2013.01)
(58) Field of Classification Search
CPC .......................................................... G01L 1/22
USPC ...................................................... 73/862.44
See application file for complete search history.

(56) References Cited

U.S. PATENT DOCUMENTS

| 5,251,484 | A * | 10/1993 | Mastache ................ 73/514.02 |
| 5,315,882 | A * | 5/1994 | Meyer et al. ............ 73/862.44 |
| 5,547,093 | A * | 8/1996 | Sparks ....................... 438/52 |
| 5,635,640 | A * | 6/1997 | Geen ........................ 73/504.12 |
| 5,991,676 | A * | 11/1999 | Podoloff et al. ......... 73/862.046 |
| 6,257,062 | B1 * | 7/2001 | Rich ........................ 73/514.32 |
| 6,422,096 | B1 * | 7/2002 | Bulat ....................... 73/862.44 |
| 6,484,585 | B1 * | 11/2002 | Sittler et al. ................ 73/718 |
| 6,520,017 | B1 * | 2/2003 | Schoefthaler et al. ..... 73/514.02 |
| 2001/0039837 | A1 * | 11/2001 | Tanizawa et al. ............ 73/715 |
| 2001/0054316 | A1 * | 12/2001 | Ohji et al. ..................... 73/780 |
| 2003/0000306 | A1 * | 1/2003 | Fell ............................ 73/504.12 |
| 2004/0045372 | A1 * | 3/2004 | Liu et al. ................... 73/862.041 |
| 2005/0230768 | A1 * | 10/2005 | Mei ............................... 257/415 |
| 2007/0186664 | A1 * | 8/2007 | Powlesland et al. ........... 73/777 |
| 2007/0222338 | A1 * | 9/2007 | Aono et al. ................... 310/334 |
| 2010/0313677 | A1 * | 12/2010 | Klein et al. ................. 73/862.044 |

(Continued)

OTHER PUBLICATIONS

Lin, et al. "A new bi-axial cantilever beam design for biomechanics force measurements." Journal of Biomechanics, vol. 45, Issue 13, Aug. 31, 2012, pp. 2310-2314.

(Continued)

*Primary Examiner* — Lisa Caputo
*Assistant Examiner* — Philip Cotey
(74) *Attorney, Agent, or Firm* — Cantor Colburn LLP

(57) ABSTRACT

A strain sensor is provided having an annular collar. At least one sensor is movably coupled to the collar, the at least one sensor having a body with a plurality of silicon strain gages coupled thereto. A first soldering connector is coupled to the collar, the first soldering connector configured to provide an excitation voltage. A plurality of second soldering connectors are coupled to the collar. A plurality of first conductors electrically are coupled to the first soldering connector on one end, and one of the plurality of silicon strain gages on a second end. A plurality of second conductors electrically are coupled between one of the plurality of second soldering connectors and one of the plurality of silicon strain gages.

11 Claims, 10 Drawing Sheets

(56) References Cited

U.S. PATENT DOCUMENTS

| | | | |
|---|---|---|---|
| 2011/0227178 A1* | 9/2011 | Kazama et al. | 257/417 |
| 2012/0011946 A1* | 1/2012 | Eriksen et al. | 73/866.5 |
| 2012/0228498 A1* | 9/2012 | Scheid et al. | 250/336.1 |
| 2013/0193531 A1* | 8/2013 | Nishikawa et al. | 257/415 |

OTHER PUBLICATIONS

Paterson, et al. "Hysteresis in the production of force by larval Dipteran muscle." Journal of Experimental Biology, vol. 213, Apr. 6, 2010, pp. 2483-2493.

* cited by examiner

MULTIDIMENSIONAL STRAIN GAGE

CROSS REFERENCE TO RELATED APPLICATIONS

The present application is a nonprovisional application of U.S. Provisional Application Ser. No. 61/763,678 filed on Feb. 12, 2013 entitled "Multidimensional Strain Gage", the contents of which are incorporated herein in their entirety.

BACKGROUND OF THE INVENTION

The subject matter disclosed herein relates to a strain gage and in particular to a multidimensional strain gage.

Use of strain gages is a well-established means of measuring strains on surfaces. They are used by fixing or bonding a strain gage to an article, and using the strain gage as one or more legs in a Wheatstone Bridge or equivalent circuit. As stresses on the article cause it to distort or change its physical shape, the attached strain gage changes its physical dimensions and its resistance to electrical current. The bridge circuit permits the sensitive measurement of this change in resistance. The strain gage correlates the change in resistance to strains in the surface. These prior art strain gages are often made of metal foils, but may also be made from other materials such as semiconductor materials like silicon, which offers a superior gage-factor: a ratio of resistance change to strain applied.

While stain gages may be used to determine dimensional changes in a part, their size has limited this application to dimensional changes over relatively large areas and often unidirectional changes in strain per gage. Accordingly, while existing strain gages are suitable for their intended purposes the need for improvement remains, particularly in providing a relatively small sensor that may be used to determine multidirectional variations across an entire surface.

BRIEF DESCRIPTION OF THE INVENTION

According to one aspect of the invention, a strain sensor is provided having an annular collar. At least one sensor is movably coupled to the collar, the at least one sensor having a body with a plurality of silicon strain gages coupled thereto. A first soldering connector is coupled to the collar, the first soldering connector configured to provide an excitation voltage. A plurality of second soldering connectors are coupled to the collar. A plurality of first conductors electrically are coupled to the first soldering connector on one end, and one of the plurality of silicon strain gages on a second end. A plurality of second conductors electrically are coupled between one of the plurality of second soldering connectors and one of the plurality of silicon strain gages.

According to another aspect of the invention, a strain sensor is provided. The strain sensor includes an annular collar having an inner diameter defining an interior portion. A plurality of sensors are arranged within the interior portion and movably coupled to the collar, each of the sensors having a body and a plurality of gages coupled to the body. A plurality of first soldering connectors are coupled to the collar, the plurality of first soldering connectors being configured to provide an excitation voltage. A second plurality of soldering connectors are coupled to the collar. A first plurality of conductors are electrically coupled on one end to one of the plurality of first soldering connectors and on a second end to one of the plurality of gages. A second plurality of conductors are electrically coupled between one of the second plurality of soldering connectors and one of the gages.

According to yet another aspect of the invention, a method of determining dimensional changes on a surface is provided. The method includes the steps of providing at least one strain gage member having an annular body and at least one sensor movably coupled within an interior portion of the annular body, the sensor including a hexagonal body having a plurality of silicon strain gages coupled thereto. At least one strain gage is coupled to a surface. A plurality of signals are received from the from the plurality of silicon strain gages, each signal representative of a change in resistance within the silicon strain gage. A strain is determined that is associated with each of the plurality of silicon strain gages. A change is determined in dimension of the surface from the strain determined at each of the silicon strain gages.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
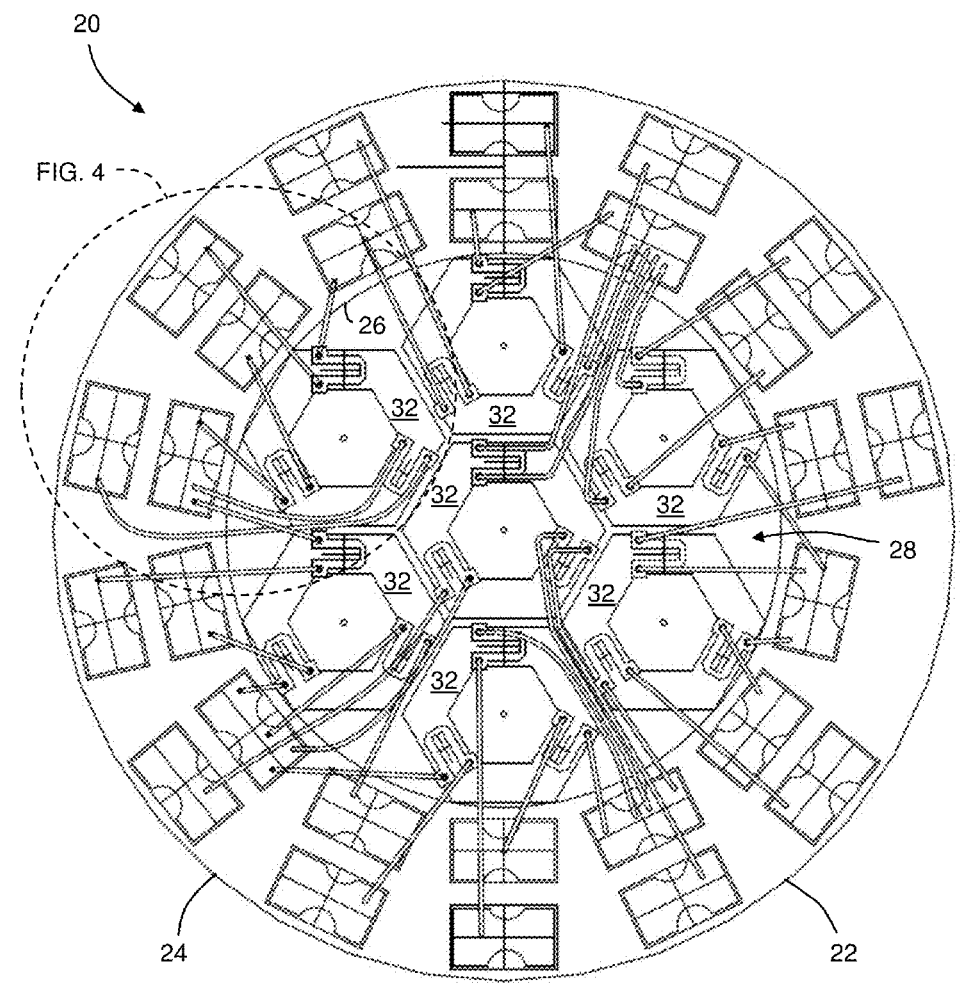
FIG. 1 is a top view of a strain gage in accordance with an embodiment of the invention.
Figure 2:
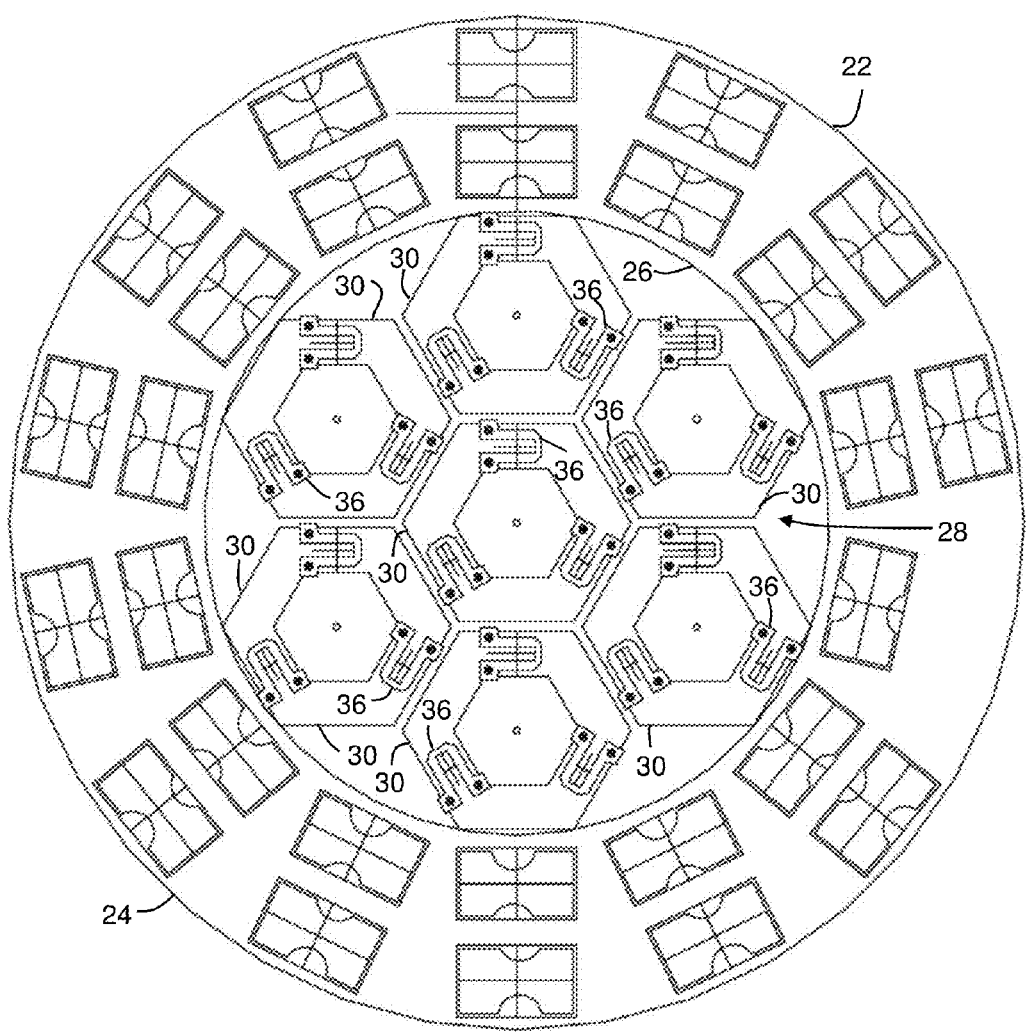
FIG. 2 is a top view of the strain gage of FIG. 1 with the wiring removed.
Figure 3:
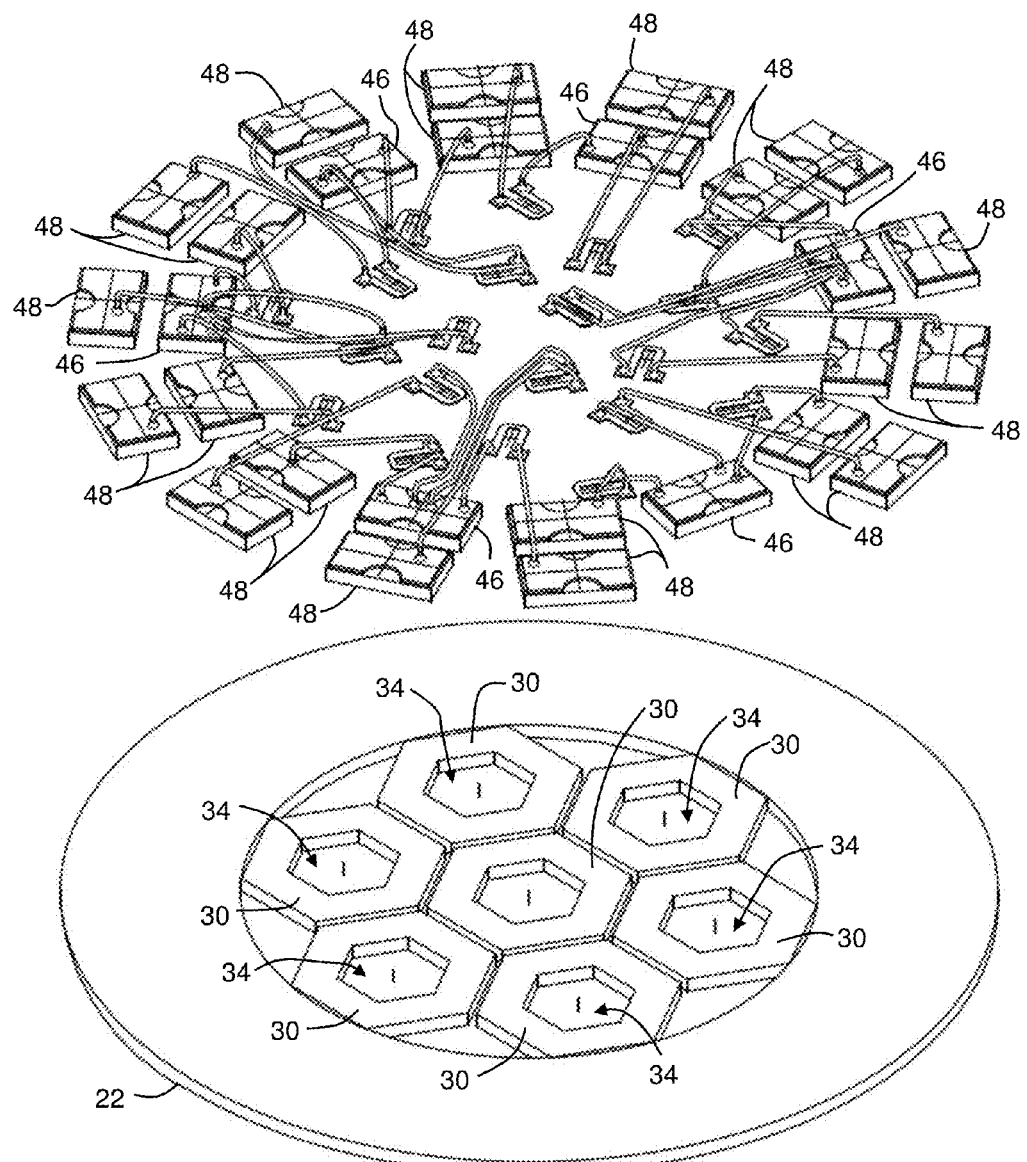
FIG. 3 is an exploded view of the strain gage of FIG. 1.
Figure 4:
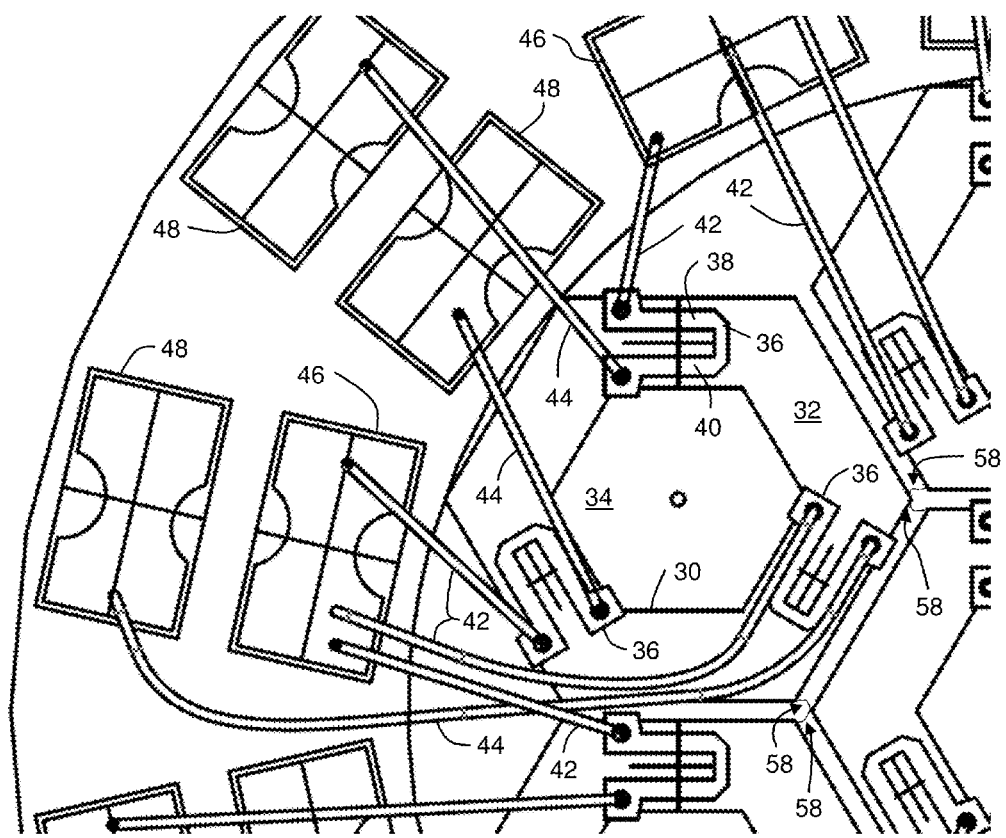
FIG. 4 is an enlarged view of the strain gage of FIG. 1.

The detailed description explains embodiments of the invention, together with advantages and features, by way of example with reference to the drawings.

DETAILED DESCRIPTION OF THE INVENTION

Embodiments of the present invention allow for the measurements of strain with a strain gage that may be scaled from having an outer dimension of less than 1.5-7.9 millimeters, and which measures strain across less than 1 mm to as large as desired based on the surface being measured. Embodiments of the invention provide advantages in allowing a plurality of strain gages to be applied across a surface to allow variations in dimensions across the surface to be measured in a simultaneous, comprehensive manner. In one embodiment, the embodiments of the invention may be integrated into a cloth or fabric structure and applied to a surface.

Referring now to FIGS. 1-4, a strain gage 20 is shown having a collar 22. The collar 22 is generally planar and annular in shape, having an outer diameter 24 and an inner diameter 26. In the exemplary embodiment, the collar 22 is made from an acrylonitrile butadiene styrene ("ABS") plastic 0.0762 millimeters thick with the outer diameter 24 being 7.875 millimeters and the inner diameter being 5.125 millimeters. It has been found that forming the collar 22 from ABS using a $CO_2$ laser provides the desired elasticity and strain modulus by mitigating melt-back upon heat absorption during cutting. In other embodiments, the collar is formed from a polycarbonate material. The collar is present to empower circuit connections and is thus not integral to strain sensing and can be optionally eliminated in yet another embodiment.

Arranged within the opening formed by the inner diameter 26 is a sensor matrix 28. The sensor matrix 28 includes a plurality of sensors 30. In the exemplary embodiment, the sensor matrix 28 maybe formed from seven sensors 30 that are generally hexagonal in shape. Each sensor 30 includes a generally planar hexagonal body 32 having an opening 34 therethrough. In one embodiment, the opening 34 allows the three non-adjacent sides of the hexagonal body 32 with silicon gages attached to flex independently of one another. In this embodiment, the other three non-adjacent sides are substantially rigid and fixed to the surface being measured. Since the hexagonal body 32 will flex as a triangle with no center there is no added stiffness when a force is applied to any other direction. In the exemplary embodiment, the body 32 is made from an ABS plastic material 0.0762 millimeters thick, the distance between two opposing surfaces is 1.55 millimeters and the distance between opposing inner surfaces is 0.855 millimeters. In the exemplary embodiment, the body 32 is made using a $CO_2$ laser cutting process. It should be appreciated that other dimensions may be used without deviating from the intended scope of the claimed invention.

Each sensor further includes a plurality of silicon gages 36 such those produced by Micron Instruments, Inc. of Simi Valley, Calif. In one embodiment, the silicon gages 36 are generally U-shaped having a pair of arms 38, 40 separated by a gap. At the end of each arm 38, 40 is a tab or ball connector is provided that is sized to receive one end of a conductor 42, 44. In the exemplary embodiment, the conductors 42, 44 are formed from 0.203 millimeter diameter gold wire and are ball bonded to the arms 38, 40. Each silicon gage 36 is connected to two conductors, the first conductor 42 connects the silicon gage 36 to a soldering tab 46 on the collar 22. The soldering tab 46 provides excitation voltage to the silicon gage 36. The excitation soldering tabs 46 are common and may be connected to multiple silicon gages 36. The second conductor 44 connects with an individual soldering tab 48. It should be appreciated that the silicon gage 36, the conductors 42, 44 and the soldering tabs 46, 48 cooperate to form a half or full Wheatstone Bridge that allows the measurement of changes in resistance across the gage 36. Since the change in resistance is proportional to the deflection of the arms 38, 40, the stain at each silicon gage 36 may be determined. It should be appreciated that since each sensor has three silicon gages 36 that are equally spaced about the body 32 and arranged on 120° angles to each other, that the three-dimensional strain may be extrapolated with reasonable precision.

Figure 5:
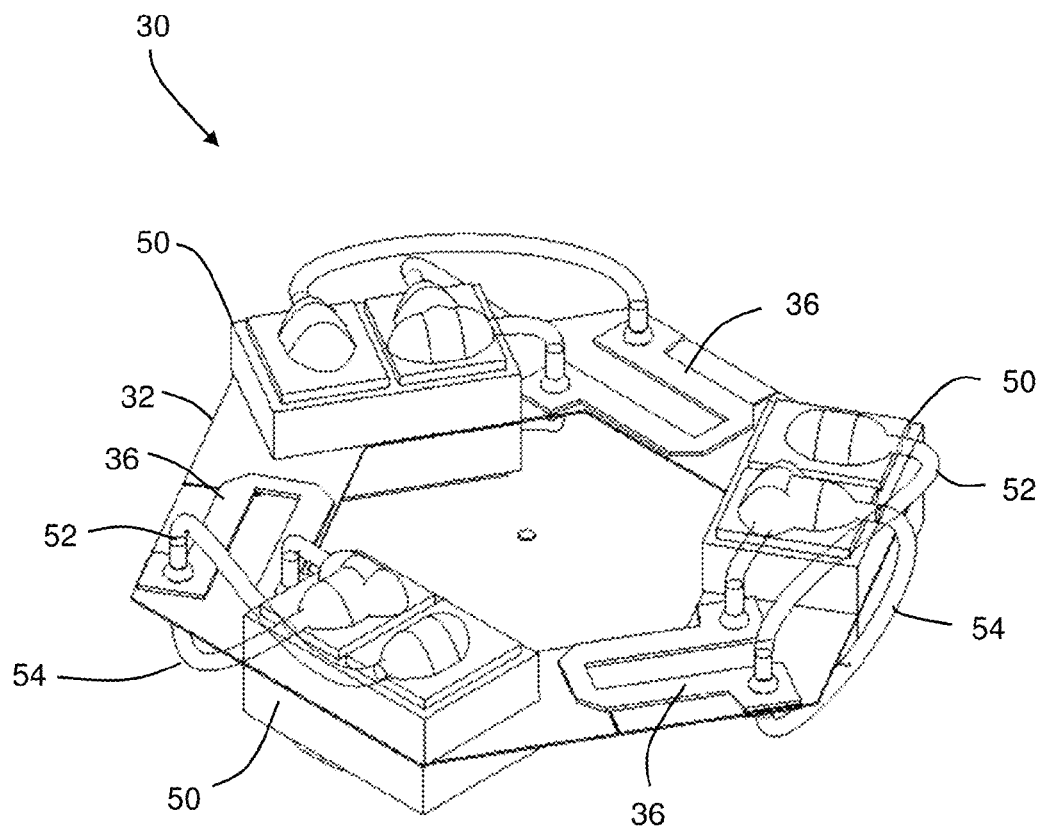
FIG. 5 is a perspective view of a sensor element in accordance with another embodiment of the invention.

Referring to FIG. 5, another embodiment of the sensor 30 is shown. In this embodiment, the sensor 30 includes soldering tabs 50 arranged between the silicon gages 36. The silicon gages 36 are coupled to the soldering tabs 50 by a pair of conductors 52, 54. In this embodiment, the soldering tabs 50 are coupled to the soldering tabs 46 on the collar 22 via conductors 42, 44. The conductors 42, 44 connect to the soldering tabs 50 on an opposite side of the body 32 from the conductors 52, 54.

Each of the silicon gages 36 is equally spaced about the hexagonal body 32. Thus, for each sensor 30 there are three strains measured and the sensor matrix 28 outputs twenty-one strain measurements. It should be appreciated that as used herein the phrase "strains measured" may mean a measured voltage generated by each of the silicon gauges 36. As will be discussed in more detail below, the twenty-one strain measurements are combined together to extrapolate the three-dimensional deformation of the surface to which the strain gage 20 is mounted. In one embodiment, the three-dimensional measurements will result from a model that renders the forces collected in the x and y plane and determine if there was a strain in the z plane using trigonometric principles. For example, in a simplified configuration having a single sensor 30, if there was equal force recorded from all three legs of a sensor 30, then it may be determined if there is a change in the z-plane. Planar strain would not be equal in all three gages. The direction of the z-displacement is simply determined by the sign of the "equal force" recorded by the individual gages.

Figure 10:
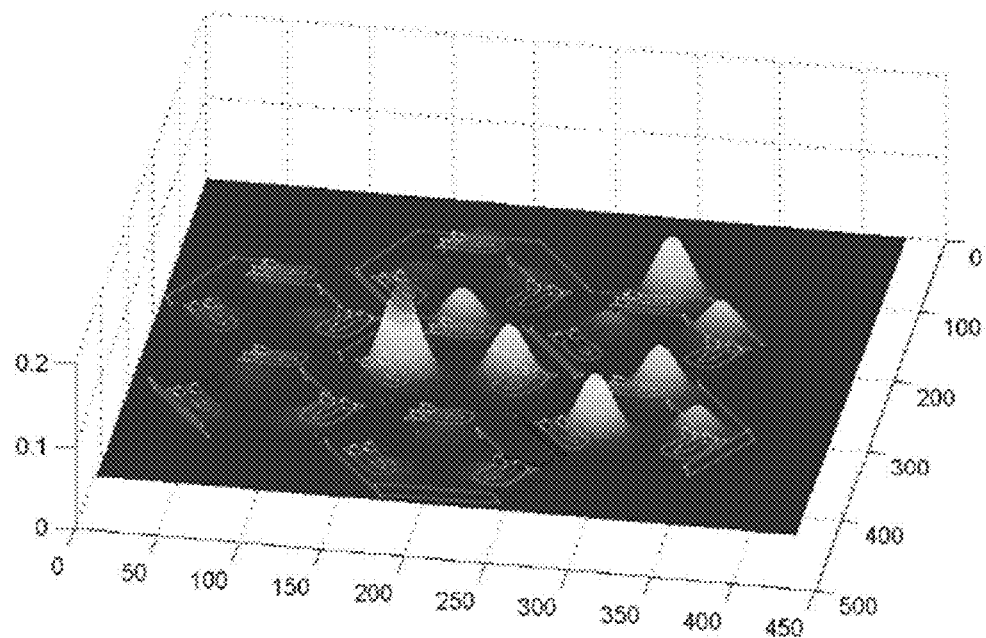
FIGS. 10-11 illustrate a Gaussian kernels based on voltages generated by the silicone gauges 36.
Figure 11:
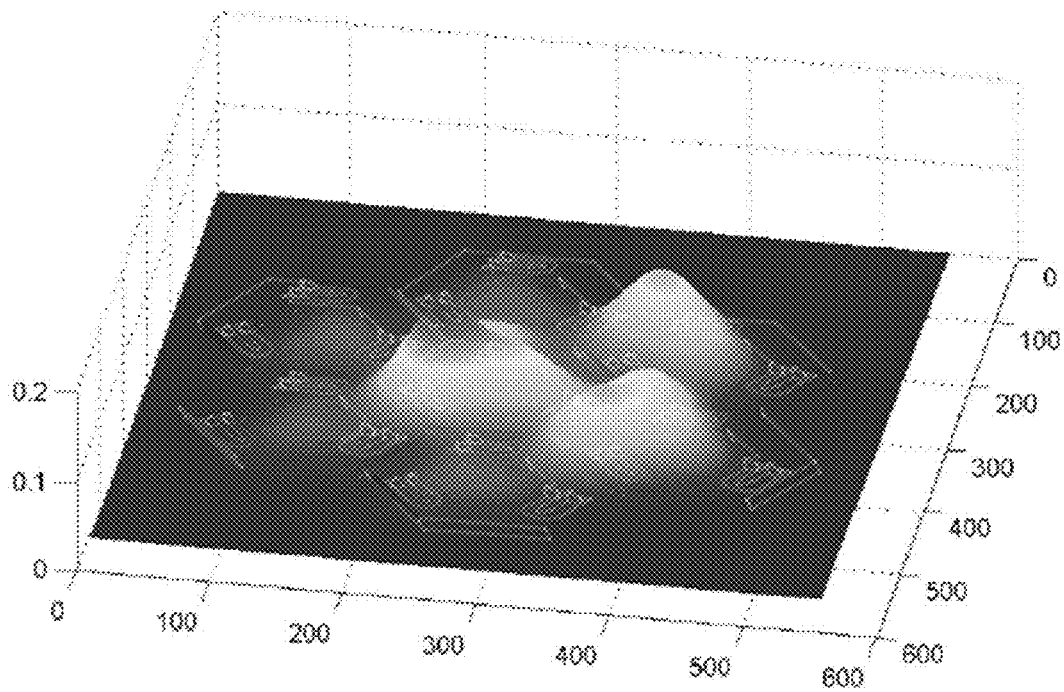

In still another embodiment, a Gaussian kernel shown in FIGS. 10-11 may be determined based on the voltages generated by the silicone gauges 36. This Gaussian kernel allows for a transfer function model of the surface being monitored, such as:

$$\left\{ f(x) = ae\left(-\left(\frac{(x-b)^2}{2c^2}\right) + d\right) \right\} \quad (1)$$

Such a transfer function may be useful as a feedback control in a robotic device for example.

Figure 6:
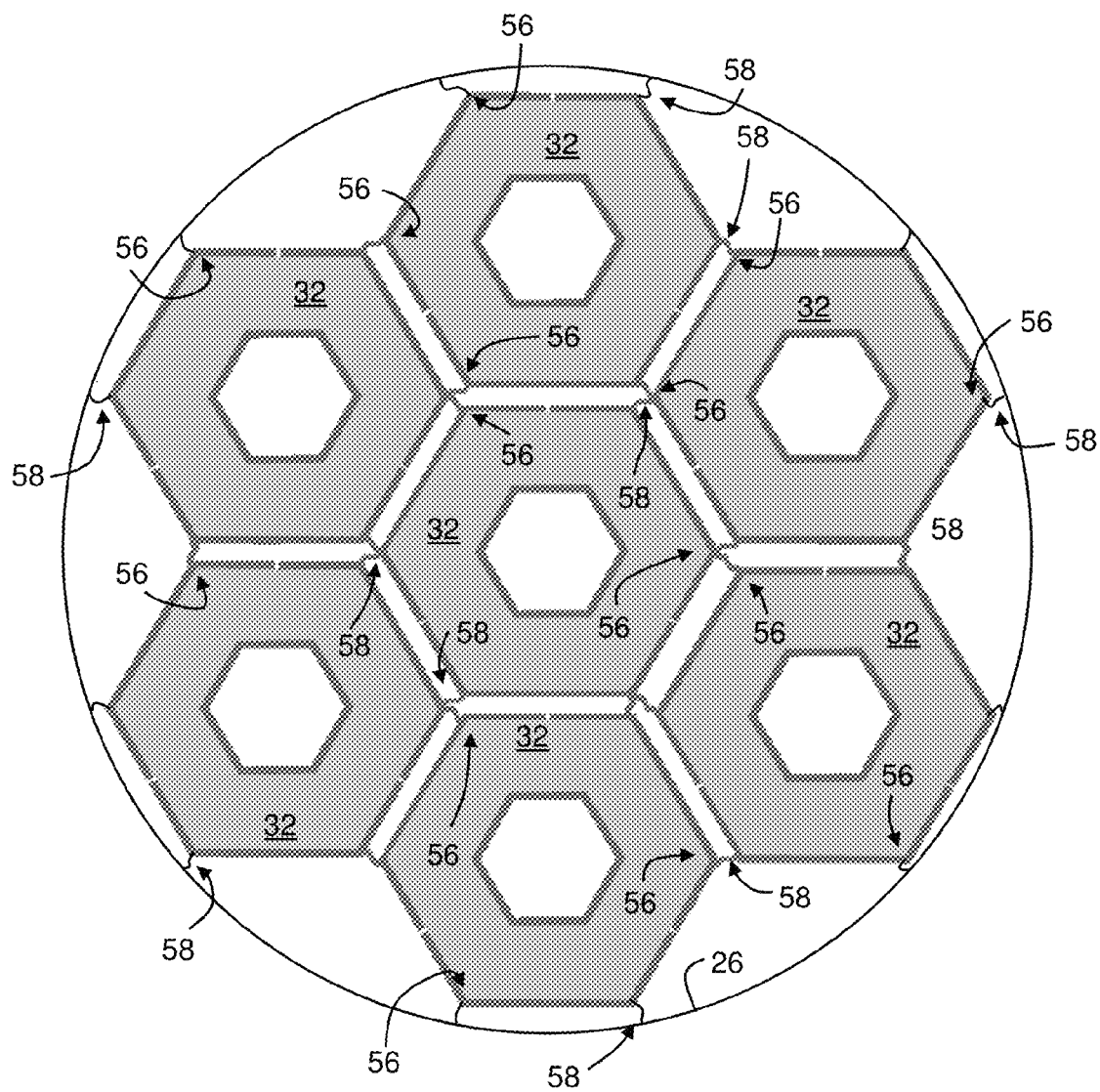
FIG. 6 is a top view of the sensor housing matrix in accordance with an embodiment of the invention.

In the exemplary embodiment, each of the sensors 30 is coupled to the adjacent sensors 30 and the collar 22 at the corners 56 of the body 32 (FIG. 6) by a bridging element 58. In one embodiment, the bridging element 58 is a monofilament or a nylon suture. In one embodiment, the bridging element is 25 micron thick. The bridging element has slack, allowing the sensor 30 relatively free movement. Therefore, as the surface moves, each sensor 30 will move as well.

During operation, the strain gage 20 may be mounted to a surface of the article that the operator desires to measure. It should be appreciated that the surface to be measured may be any surface. In one embodiment, the stain gage 20 is mounted to the skin of an animal, such as a cephalopod for example. In other embodiments, the strain gage 20 may be used in connection with medical surgery devices, prosthetics, robotics or in physiological testing for example. In still another embodiment, the strain gage 20 may be used in cooperation with an active airfoil for a flying vehicle (e.g. an airplane) that corrects its deformation in real or substantially real-time.

As the surface being monitored moves, the deformations of the surface will cause deformations of the silicon gages 36 on the sensors 30. The deformation of the silicon gage 36 results in a change in resistance of the silicon gage 36 that is measured by the Wheatstone Bridge. In one embodiment, the determination of the strain is similar to that described in the paper entitled "Hysteresis in the production of force by larval Dipteran muscle" by Paterson, Anikin and Krans 2010, Journal of Experimental Biology (J Exp Biol 2010 23:2483-2493) which is incorporated by reference herein in its entirety. The determination of the strain may further be determined in the paper entitled A new bi-axial cantilever beam design for biomechanics for measurements" by Lin and Trimmer, Journal of Biomechanics (Journal of Biomechanics, Vol 45, Issue 13, 31 Aug. 2012, 2310-2314) which is incorporated herein in its entirety. It should be appreciated that since each strain gage 20 includes a plurality of sensors 30, the three dimensional deformation of the surface at the location of the strain gage 20 may be determined.

Thus the movement of the surface may be monitored. It should be appreciated that due to the size of the stain gage 20, any size matrix of strain gages 20 may be coupled or applied to a surface to allow the deformation or movement of the surface to be monitored.

Figure 7:
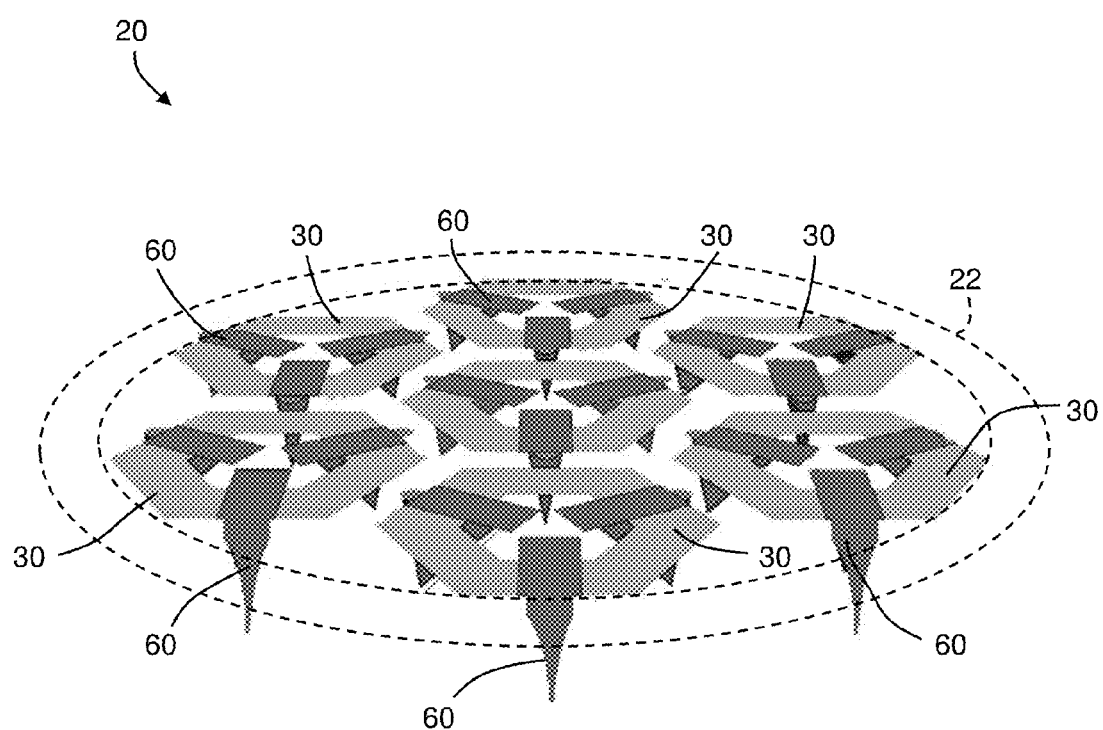
FIG. 7 is a perspective view of the sensor housing matrix in accordance with another embodiment of the invention.

Referring now to FIG. 7, another embodiment of the strain gage 20 is shown. In this embodiment, each of the sensors 30 has a plurality of leg members 60. In one embodiment, the leg members 60 form a tripod that supports the sensor 40. The leg members 60 are coupled to the body 32 at one end and have a narrow or pointed opposing end. In this embodiment, the leg members 60 may be used to couple the strain gage 20 onto the surface being measured. In one embodiment, the collar 22 the nylon monofilament provides a desired level of mechanical disconnect, and freedom of motion between the collar and strain gages.

Figure 8:
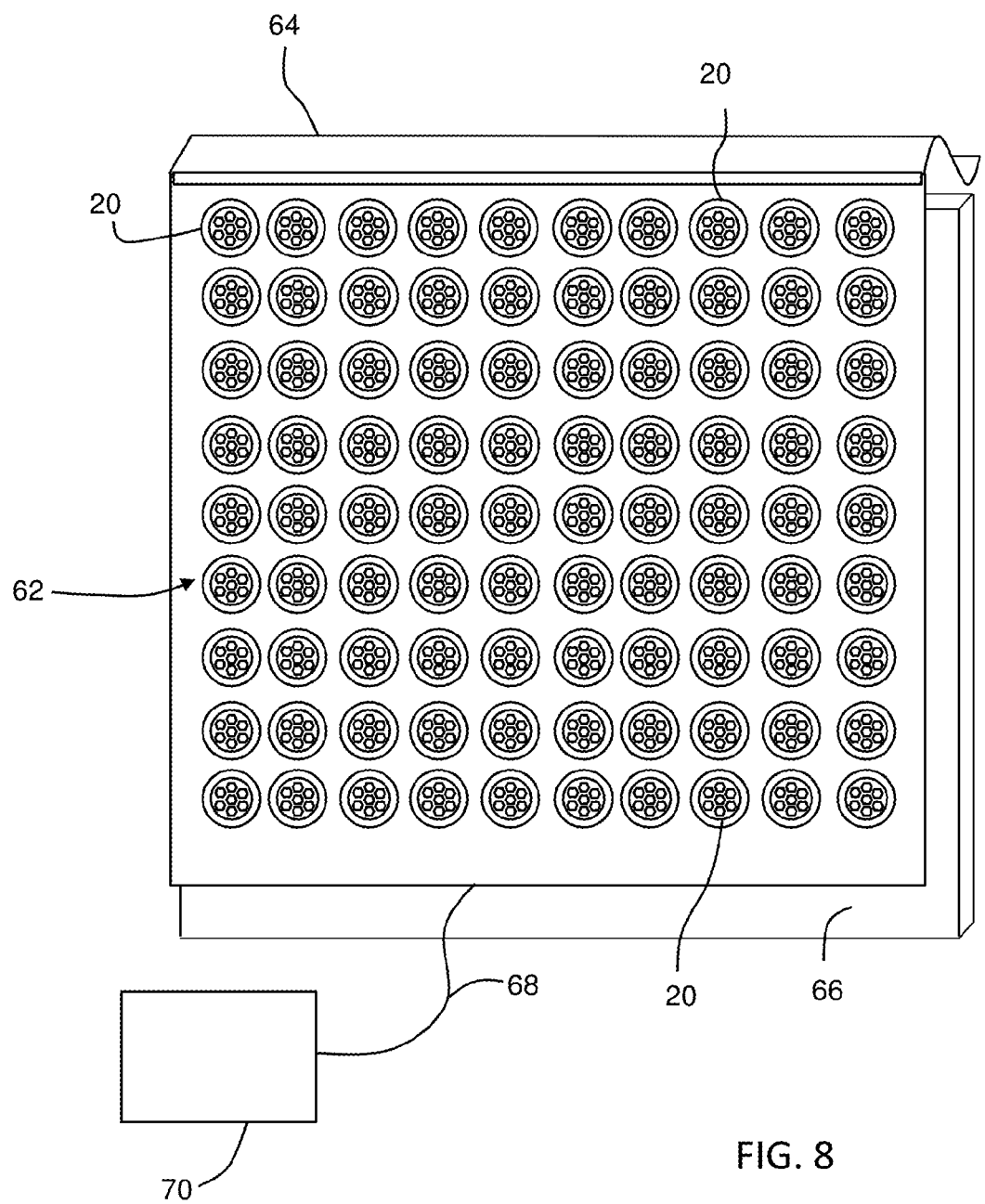
FIG. 8 is a perspective view of an array of stain gages applied to surface in accordance with an embodiment of the invention.

Referring now to FIG. 8, an embodiment of the strain gage 20 is shown arranged in an array 62. In this embodiment, a plurality of strain gages 20 are coupled to a flexible body member 64. The flexible body member 64 may be a woven fabric or a sheet of polymeric material for example. The flexible body member 64 is configured to retain the array 62 without imposing substantial loads of the individual strain gages 20 such that the strain measured by the strain gages 20 is from the surface 66 being measured and not the body member 64. The body member 64 further provides support for wiring 68 from each of the strain gages 20 such that they may be aggregated for connection to an external processing device, such as a computer 70. This embodiment provides advantages in allowing an array of strain gages 20 to be quickly and easily coupled to a surface 66. It should be appreciated that while the illustrated embodiment of FIG. 8 shows the strain gages 20 as being separated by a distance, this is for purposes of clarity and the claimed invention should not be so limited. In other embodiments, the strain gages 20 are located directly adjacent each other with sufficient clearance to avoid having the deformation or movement of one strain gage 20 from effecting the operation or measurements of an adjacent strain gage 20. In still another embodiment, each strain gage 20 is arranged in contact with each immediately adjacent strain gage 20.

Figure 9:
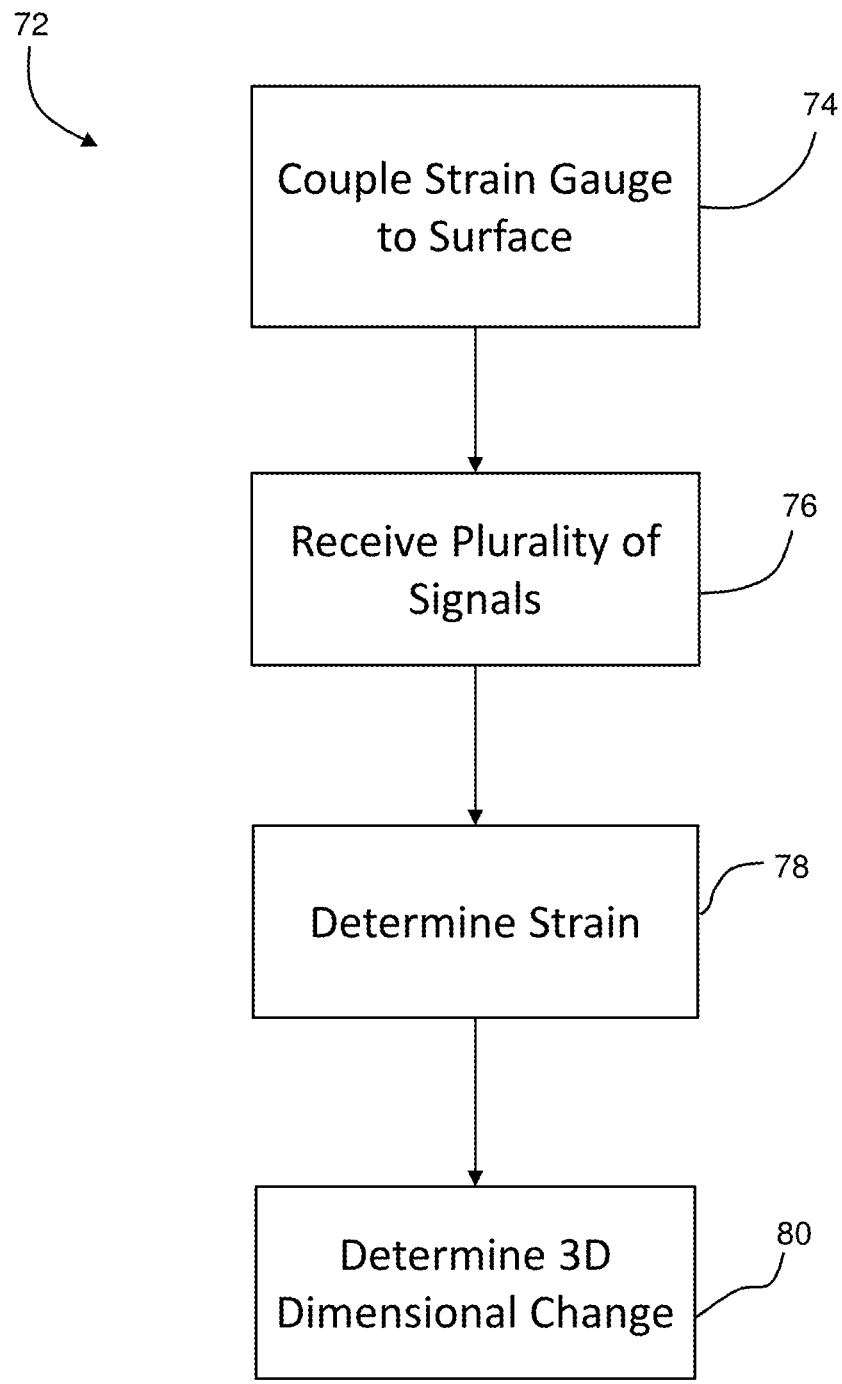
FIG. 9 is a flow chart for determining the dimensional changes of a surface using the strain gage of FIG. 1.

Referring now to FIG. 9, a method 72 is shown for determining three-dimensional changes in a surface 66. The method 72 starts by coupling one or more the strain gages 20 to a surface 66 in block 74. The strain gages 20 may be individually applied, or the strain gages 20 may be arranged in an array such as that shown in FIG. 8. The method then proceeds to receive a plurality of signals in block 76 from each of the strain gages 20 that were applied to the surface 66. These signals, which represent changes in the resistance of each sensor 30 (e.g. a voltage) are used in block 78 to determine the strain in multiple dimensions on the surface 66 at each strain gage 20. In one embodiment, a single strain in each coordinate direction is determined for each strain gage 20. In other embodiments a strain is determined for each sensor 30 by extrapolating the strain from each of the stain gages 20 as discussed herein above, and each strain gage 20 provides a plurality of strains. After determining the strains, the method 72 then proceeds to block 80 where the multidirectional variations the surface are determined.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Further, while specific dimensions have been provided, it is understood that larger or smaller dimensions may be used depending on the desired application. Accordingly, the invention is not to be seen as limited by the foregoing description, but is only limited by the scope of the appended claims.

The invention claimed is:

1. A strain sensor comprising:
   an annular collar having an inner diameter;
   at least one sensor coupled to the collar by at least one flexible bridge member, the at least one flexible bridge member configured to allow the at least one sensor to move relative to the collar, the at least one sensor being disposed within the inner diameter of the collar, the at least one sensor having a hexagonally shaped body with three silicon strain gages coupled thereto, the three strain gages being arranged 120 degrees apart on three non-adjacent sides of the body;
   a first soldering connector coupled to the collar, the first soldering connector configured to provide an excitation voltage;
   a plurality of second soldering connectors coupled to the collar;
   a plurality of first conductors electrically coupled to the first soldering connector on one end, and one of the plurality of silicon strain gages on a second end; and
   a plurality of second conductors electrically coupled between one of the plurality of second soldering connectors and one of the plurality of silicon strain gages.

2. The strain sensor of claim 1 wherein the at least one sensor includes seven sensors disposed within the inner diameter of the annular collar.

3. The strain sensor of claim 1 wherein the at least one flexible bridging member includes a plurality of bridging members, each of the bridging members coupling associated with at least one sensor of the seven sensors, each of the bridging members coupling the associated sensor to an adjacent sensor or to the collar.

4. The strain sensor of claim 3 wherein the bridging member is a monofilament.

5. The strain sensor of claim 1 wherein the collar has an outer diameter of 7.785 millimeters and body has a hexagonal shape with a distance between opposing surfaces of 1.55 millimeters.

6. The strain sensor of claim 1 wherein the at least one flexible bridging element is coupled between a corner of the body and the inner diameter of the collar.

7. The strain sensor of claim 1 wherein the collar is formed from acrylonitrile butadiene styrene using a $CO_2$ laser.

8. The strain sensor of claim 7 wherein the body is formed from acrylonitrile butadiene styrene using a $CO_2$ laser.

9. The strain sensor of claim 1 wherein the three silicon strain gages are each U-shaped having a pair of arms separated by a gap.

10. The strain sensor of claim 9 wherein the three silicon strain gages and the body are configured to allow each of the three silicon stain gages to flex independently of one another.

11. The strain sensor of claim 1 wherein the body is planar and has an opening therethrough.

* * * * *